May 9, 1950 N. J. COLLINGS 2,507,093
PULLEY
Filed Feb. 26, 1948 2 Sheets-Sheet 1
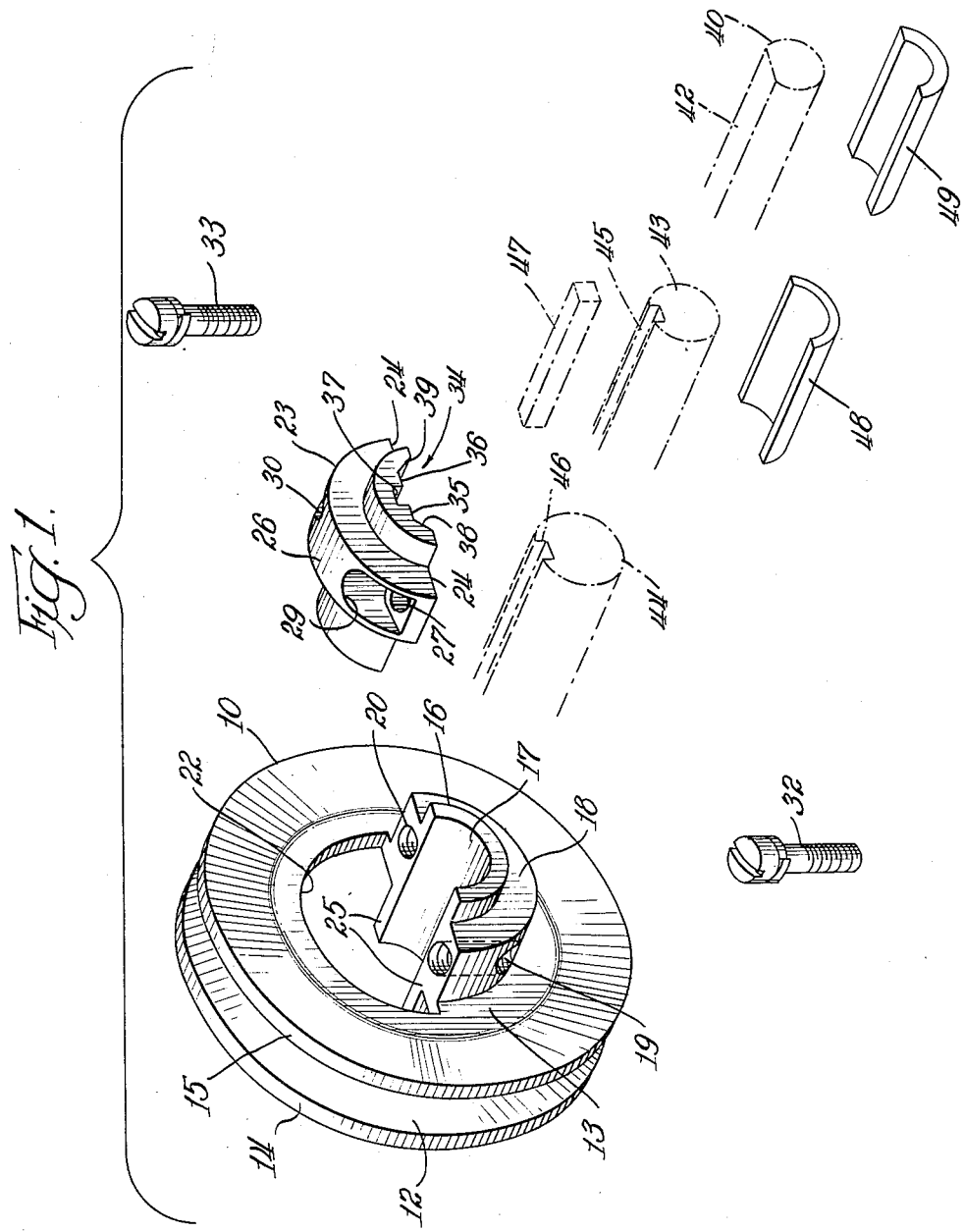
INVENTOR.
Nigel J. Collings
BY Albert G. McCaleb
Att'y May 9, 1950  N. J. COLLINGS  2,507,093
PULLEY
Filed Feb. 26, 1948  2 Sheets-Sheet 2
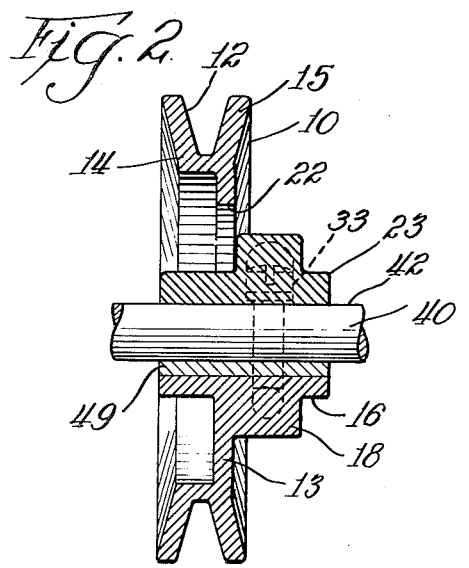
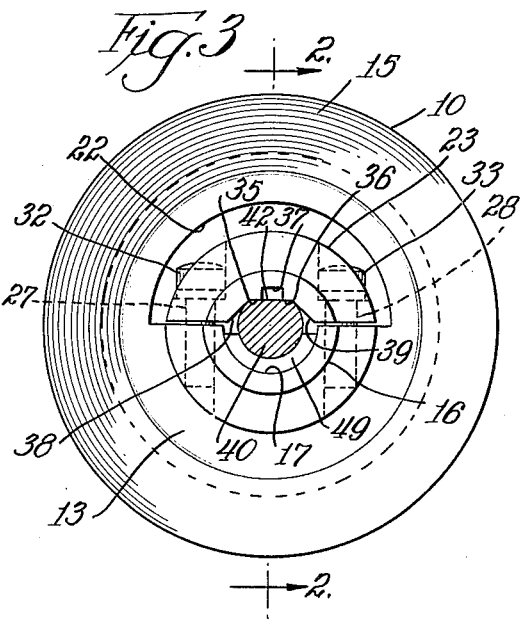
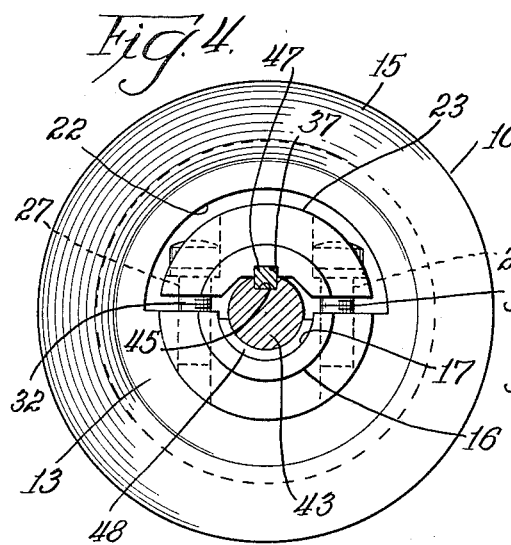
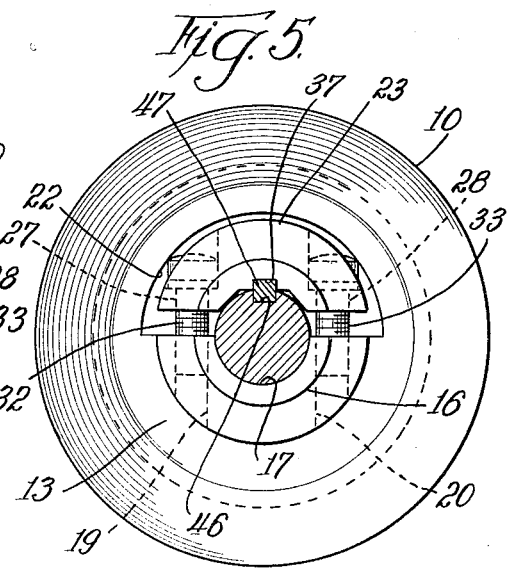
INVENTOR.
Nigel J. Collings
BY
Albert G. McCaleb
Atty.

Patented May 9, 1950

2,507,093

UNITED STATES PATENT OFFICE 2,507,093

PULLEY

Nigel J. Collings, Lombard, Ill., assignor to W. R. Brown Corporation, Chicago, Ill., a corporation of Illinois Application February 26, 1948, Serial No. 11,150

1 Claim. (Cl. 287—52)

My invention relates to pulleys, and more particularly to the structure of pulleys adapted to be mounted in concentric and driving relationship upon shafts having any one of a plurality of diameters.

One of the objects of this invention is to provide a pulley constructed and arranged for concentric mounting on shafts of predetermined diameters which have a flat surface portion or are provided with a way for a key adapted to prevent relative rotation between the pulley and shaft.

As another object, the invention comprehends the provision of a pulley having separable hub portions which are together of less than circular span, and one of which has an arcuate and axial shaft bore of predetermined diameter therein, while the other embodies an axial and non-circular shaft-receiving opening contoured to coact with a keyed shaft or one having a flat surface portion.

For a further object, my invention has within its purview the provision of a pulley having separable hub portions for mounting in opposed relationship and one of which is integral with the pulley wheel, and has a central shaft bore of predetermined diameter therein, while the other hub portion has a shaft opening which is generally and partly polygonal with an adjoining key slot, whereby the pulley is normally centered on a shaft of said predetermined diameter and subject to centering on shafts of a size smaller than said predetermined diameter by the use of a partially cylindrical insert, and the said other hub portion is adapted for locking engagement on a flat portion of a shaft, or with the shaft through a key.

Other objects and advantages of the invention will be apparent from the following description and the accompanying drawings in which similar characters of reference indicate similar parts through the several views.

Referring to the two sheets of drawings,

Fig. 1 is an exploded view of a pulley structure embodying a preferred form of my invention and depicting the assemblies of parts by which the disclosed pulley may be fixedly mounted in concentric relationship upon shafts of different diameters and having either a key or a flat portion for preventing relative rotation between the pulley and shafts;

Figs. 2 and 3 are respectively side sectional and end elevational views of the pulley structure shown in Fig. 1 and wherein the pulley is mounted on a shaft of a diameter smaller than the shaft bore of the pulley and having a flat surface portion;

Fig. 4 is an end elevational view similar to Fig. 3 but depicting the mounting of the pulley on a shaft somewhat larger than that shown in Fig. 3 and provided with a key for preventing relative rotation between the pulley and shaft; and Fig. 5 is another end elevational view similar to Figs. 3 and 4 wherein the mounting of the pulley on a shaft of a diameter equal to that of the shaft bore and having a key is illustrated.

Having referred to the exemplary embodiment of my invention, a preferred form of which is shown in the accompanying drawings for illustrative purposes, a pulley wheel 10, which may be any one of a variety of types, is depicted as one having a peripheral V-groove 12 ordinarily used with conventional V-belts and the like. In general, the pulley wheel 10 is of integral formation having an internal web portion 13 from which flange portions 14 and 15 project to define the outer V-groove 12.

On one side of a diametral dividing line, a semi-circular hub 16 is formed integrally with the web portion 13 and preferably extends in both directions from the web axially of the pulley wheel and in concentric relationship thereto. Internally of the hub 16, it is provided with a semi-circular shaft bore 17 concentric with the pulley wheel axis and having a diameter adapted to fit the largest shaft upon which the pulley is to be used. In the disclosed embodiment of my invention, an integral collar portion 18 is provided on the outside of the hub portion and adjacent one side of the web, which collar portion not only reenforces the hub, but has therein substantially parallel screw holes 19 and 20 on opposite sides of the shaft bore 17 and extending laterally thereof.

On the other side of the aforementioned diametrical dividing line from the hub portion 16, the web portion 13 of the pulley wheel has a substantially semi-circular opening 22 therein of a diameter larger than the hub portion 16 and adapted to receive a separable hub portion 23. The hub portion 23, by preference, is externally arcuate and of less than semi-circular span. It is provided, however, with coplanar side surfaces 24 adapted to mounting in opposed relationship to coplanar side surfaces 25 of the hub portion 16. On its outer surface, the hub portion 23 has an integral collar portion 26 corresponding in position to that of the collar portion 18 and having therein bores 27 and 28 disposed for alignment with the threaded screw holes 19 and 20 in the collar portion 18. Also, and preferably, recesses 29 and 30 are provided in the outer surface of the collar portion 26 for the accommodation of the heads of screws 32 and 33 or other suitable fastening means by which the hub portion 23 is secured to the hub portion 16.

Thus, generally, the hub portions 16 and 23 are externally substantially co-extensive. In order, however, to effect the fixed or non-rotational mounting of the pulley relative to shafts of different diameters and having either a key or a flat surface portion, the shaft receiving opening 34 of the hub portion 23 is of non-circular section. As disclosed, the shaft receiving opening 34 is partially defined by substantially coplanar surfaces 35 and 36 of substantial width, separated by, and extending along the opposite sides of, a substantially rectangular key slot 37. Sectionally, the shaft receiving opening 34 is symmetrical with respect to a central plane which, in the assembly of the hub portions, divides the semi-circular shaft bore 17. Generally, the key slot 37 and coplanar surfaces 35 and 36 are in diametrically opposed relationship to the surface of the shaft bore 17 when the hub portions are assembled. Additional surfaces 38 and 39 adjoin opposite sides of the coplanar surfaces 35 and 36 respectively and are disposed in obtuse angular relationship to the coplanar surfaces and in opposed relationship to one another, to complete the definition of the shaft receiving opening 34.

The width of the key slot 37 is such that it fits a key of a standard size used in conjunction with shafts within a predetermined range of diameters. The combined lateral width of the key slot 37 and adjacent coplanar surfaces 35 and 36 is selected to fit against the surface of a flat portion of standard dimensions on a shaft of predetermined size. The angularly disposed side surfaces 38 and 39 straddle the shafts with which the pulley is used and are preferably disposed for tangency with the outer surface of a shaft having a flat portion and of a size with which the pulley is adapted to use.

In the accompanying drawings, I have illustrated the adaptation of a preferred form of my pulley structure to a shaft 40 of a preselected small diameter having a flat surface portion 42 of standard dimensions thereon, as well as with shafts 43 and 44 of intermediate and large diameters respectively, having key slots 45 and 46 therein. By way of example only, and without any intent to be limited to any specific shaft sizes, the diameter of the shafts 40, 43 and 44 may be respectively ½", ⅝", and ¾". The width of a standard flat portion on a ½" shaft is approximately ⅜", while keys of approximately $\frac{3}{16}$" width are used generally in shafts of ⅝" and ¾" diameters.

Since the shaft bore 17 of the hub portion 16 which is integral with the pulley wheel is of a size to fit a shaft such as 44 of the largest diameter with which the pulley is to be used, the pulley is self-centering on a shaft of that size. In that instance, the shaft 44 fits directly into the shaft bore 17, as shown in Fig. 5, while the hub portion 23 is clamped against the opposite side of the shaft by fastening means such as the screws 32 and 33 and a key 47 is fitted into the adjacent key slots 46 and 37 of the shaft and hub portion respectively. With the shaft 43 of smaller diameter, the centering of the pulley relative to the shaft is effected, as depicted in Figs. 1 and 4, by a substantially semi-circular sleeve 48 of the proper thickness interposed between the shaft 43 and the shaft bore 17 of the hub portion 16. Again, and with only this difference, removable hub portion 23 is clamped against the opposite side of the shaft from the shaft bore 17 with the key 47 inserted in the adjacent key slots 45 and 37 of the shaft and hub portion respectively.

When mounted on a small shaft, as illustrated in Figs. 2 and 3, a substantially semi-circular insert 49 effects the centering of the pulley with respect to the shaft. Since, in the instance illustrated, the small shaft is provided with a flat surface portion 42, the pulley is prevented from rotation relative to the shaft by the engagement of the coplanar flat surfaces 35 and 36 of the hub portion with the flat surface of the shaft. As in the previously described instance, the hub portion 23 is clamped against the shaft opposite the hub portion 16 by fastening means such as the screws 32 and 33.

From the foregoing description and the illustrations of the drawings, it may be understood that I have provided a pulley structure of relatively inexpensive design which may be readily applied to shafts of different sizes within a reasonable range and which have different locking means for preventing relative rotation between the pulley and shafts.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

A pulley structure adapted to be fixedly mounted on either a shaft of the type having a keyway and utilizing a key or a shaft having a flat surface portion for insuring a driving connection and comprising, in combination, a pulley wheel, said pulley wheel having thereon a hub portion having therein a substantially semi-circular shaft bore of predetermined diameter and concentric with the pulley wheel axis, said pulley wheel also having an axial opening therethrough of a size exceeding that of the shaft bore and in diametrically opposed relationship to the shaft bore, and a separate hub portion for said pulley wheel adapted to be removably secured to the hub portion of the pulley wheel in opposed relationship to the shaft bore, said separate hub portion having axially therethrough a shaft receiving opening of appreciably less than semi-circular span and partially defined by coplanar flat surfaces on opposite sides of a key slot, said coplanar flat surfaces being adjoined on opposite axial sides by additional and opposed flat surfaces disposed in obtuse angular relationship respectively to the adjacent coplanar surfaces, said coplanar surfaces and key slot having a combined width sufficient to fit against the flat portion of a shaft of said predetermined diameter, and said key slot being of a size to fit the key in the keyway of a shaft of said predetermined diameter.

NIGEL J. COLLINGS.

REFERENCES CITED

The following references are of record in the file of this patent:

UNITED STATES PATENTS

| Number | Name | Date |
|---|---|---|
| 360,645 | Baute | Apr. 5, 1887 |
| 818,171 | Hicks | Apr. 17, 1906 |